(12) United States Patent
Kim et al.

(10) Patent No.: US 12,330,662 B2
(45) Date of Patent: Jun. 17, 2025

(54) APPARATUS AND METHOD FOR CONTROLLING VEHICLE

(71) Applicants: Hyundai Motor Company, Seoul (KR); Kia Corporation, Seoul (KR)

(72) Inventors: Yang Shin Kim, Incheon (KR); Dong Hoon Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 399 days.

(21) Appl. No.: 17/879,282

(22) Filed: Aug. 2, 2022

(65) Prior Publication Data

US 2023/0182750 A1 Jun. 15, 2023

(30) Foreign Application Priority Data

Dec. 14, 2021 (KR) .......................... 10-2021-0178970

(51) Int. Cl.
*G06K 9/00* (2022.01)
*B60W 40/12* (2012.01)
*G06T 7/60* (2017.01)
*G06T 7/73* (2017.01)
*H04N 23/90* (2023.01)

(52) U.S. Cl.
CPC .............. *B60W 40/12* (2013.01); *G06T 7/60* (2013.01); *G06T 7/73* (2017.01); *H04N 23/90* (2023.01); *B60W 2420/403* (2013.01); *B60W 2530/205* (2020.02); *G06T 2207/30252* (2013.01)

(58) Field of Classification Search
CPC .............................. G06V 10/62; G06V 10/44
See application file for complete search history.

(56) References Cited

U.S. PATENT DOCUMENTS

| 11,017,672 | B2 | 5/2021 | Kim | |
|---|---|---|---|---|
| 11,972,626 | B2* | 4/2024 | Zagaynov | ............ G06V 30/414 |
| 12,084,107 | B2* | 9/2024 | Zimmermann | ........ G06V 10/82 |
| 2008/0174602 | A1* | 7/2008 | Hsu | .......... G06T 15/00 |
| | | | | 345/441 |
| 2010/0008565 | A1* | 1/2010 | Chien | ....................... G06T 3/00 |
| | | | | 382/154 |

(Continued)

FOREIGN PATENT DOCUMENTS

| KR | 10-2193970 B | 12/2020 |
|---|---|---|
| WO | WO 2017123531 | 7/2017 |
| WO | WO 2021151516 | 8/2021 |

*Primary Examiner* — Hadi Akhavannik
(74) *Attorney, Agent, or Firm* — Morgan, Lewis & Bockius LLP (57) ABSTRACT

A vehicle control apparatus includes a camera that obtains a surrounding image of a vehicle, and a controller that estimates a position of a first corner point and a position of a second corner point of a trailer connected to the vehicle based on the surrounding image, estimates a position of a third corner point of the trailer using a position of the camera, the position of the first corner point, and the position of the second corner point, and estimates a length of the trailer based on the position of the first corner point and the position of the third corner point. The vehicle control apparatus improves the stability of autonomous driving by reducing the risk of lane encroachments and vehicle collisions, by allowing an autonomous vehicle towing a trailer to actively estimate the length of the trailer.

20 Claims, 6 Drawing Sheets

(56) References Cited

U.S. PATENT DOCUMENTS

| | | |
|---|---|---|
| 2015/0291179 A1* | 10/2015 | Tagesson ............ B60W 40/105 |
| | | 702/158 |
| 2016/0049020 A1* | 2/2016 | Kuehnle .............. G07C 5/0841 |
| | | 701/34.4 |
| 2017/0197598 A1 | 7/2017 | Lesher et al. |
| 2018/0319438 A1* | 11/2018 | Herzog .................... B60D 1/62 |
| 2018/0365509 A1* | 12/2018 | Naserian ................ G06V 20/56 |
| 2019/0086204 A1 | 3/2019 | Critchley et al. |
| 2019/0375399 A1* | 12/2019 | Kasaiezadeh Mahabadi .............. |
| | | G06V 20/56 |
| 2020/0125881 A1* | 4/2020 | Pribble ................ G06V 30/414 |
| 2020/0372802 A1 | 11/2020 | Kim |
| 2022/0138915 A1* | 5/2022 | Golas ........................ G06T 5/80 |
| | | 345/427 |
| 2022/0258800 A1* | 8/2022 | Zimmermann ......... B60R 11/04 |
| 2022/0301186 A1* | 9/2022 | Nister .................... G06V 10/82 |

\* cited by examiner

APPARATUS AND METHOD FOR CONTROLLING VEHICLE

CROSS-REFERENCE TO RELATED APPLICATION

The present application claims priority to Korean Patent Application No. 10-2021-0178970, filed on Dec. 14, 2021, the entire contents of which is incorporated herein for all purposes by this reference.

BACKGROUND OF THE PRESENT DISCLOSURE

Field of the Present Disclosure

The present disclosure relates to an apparatus and a method for controlling a vehicle.

Description of Related Art

A trailer is a vehicle which is connected to a towing vehicle without a traction power to carry loads or people. When a trailer is fastened to an autonomous vehicle, a driver should directly input a length of the trailer when setting a system for ease of autonomous driving. However, in the case of an autonomous vehicle in which a trailer is frequently changed due to its characteristics, such as a commercial truck, the driver should input the length of the trailer each time the trailer is changed, so the present method may cause inconvenience to the driver.

Furthermore, because it is realistically impossible for the driver to grasp the specification information of all trailers, the length of the trailer may not be entered correctly, which may cause errors in the movement paths of commercial trucks and trailers. Accordingly, there are problems that can lead to accidents, such as lane encroachments and collisions with other vehicles.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus and method in which an autonomous vehicle towing a trailer can actively estimate the length of the trailer.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a camera that obtains a surrounding image of a vehicle, and a controller that estimates a position of a first corner point and a position of a second corner point of a trailer connected to the vehicle based on the surrounding image, estimates a position of a third corner point of the trailer using a position of the camera, the position of the first corner point, and the position of the second corner point, and estimates a length of the trailer based on the position of the first corner point and the position of the third corner point.

According to an exemplary embodiment of the present disclosure, the camera may include a first camera that obtains a left rear image of the trailer, and a second camera that obtains a right rear image of the trailer.

According to an exemplary embodiment of the present disclosure, the controller may be configured to generate a first virtual plane parallel to a line segment connecting the first camera to the second camera by performing an image rectification with respect to the left rear image, and may determine coordinates of a first projection point at which a first vector connecting the first corner point to the first camera is projected onto the first virtual plane.

According to an exemplary embodiment of the present disclosure, the controller may be configured to generate a second virtual plane parallel to the line segment connecting the first camera to the second camera by performing an image rectification with respect to the right rear image, and may determine coordinates of a second projection point at which a second vector connecting the first corner point to the second camera is projected onto the second virtual plane.

According to an exemplary embodiment of the present disclosure, the controller may estimate the position of the first corner point based on the coordinates of the first projection point and the coordinates of the second projection point.

According to an exemplary embodiment of the present disclosure, the controller may be configured to generate a first virtual plane parallel to a line segment connecting the first camera to the second camera by performing an image rectification with respect to the left rear image, and may determine coordinates of a third projection point at which a third vector connecting the second corner point to the first camera is projected onto the first virtual plane.

According to an exemplary embodiment of the present disclosure, the controller may be configured to generate a second virtual plane parallel to the line segment connecting the first camera to the second camera by performing an image rectification with respect to the right rear image, and may determine coordinates of a fourth projection point at which a fourth vector connecting the second corner point to the second camera is projected onto the second virtual plane.

According to an exemplary embodiment of the present disclosure, the controller may estimate the position of the second corner point based on the coordinates of the third projection point and the coordinates of the fourth projection point.

According to an exemplary embodiment of the present disclosure, the controller may be configured to generate a fifth vector perpendicular to a line segment connecting the first corner point to the second corner point.

According to an exemplary embodiment of the present disclosure, the controller may be configured to determine coordinates of a fifth projection point at which a sixth vector connecting the third corner point to the first camera is projected onto the first virtual plane, and may determine the position of the third corner point based on the coordinates of the fifth projection point and the fifth vector.

According to an aspect of the present disclosure, a vehicle control method includes obtaining a surrounding image of a vehicle, estimating, by the controller, a position of a first corner point and a position of a second corner point of a trailer connected to the vehicle based on the surrounding image, estimating, by the controller, a position of a third corner point of the trailer using a position of the camera, the position of the first corner point, and the position of the second corner point, and estimating, by the controller, a length of the trailer based on the position of the first corner point and the position of the third corner point.

According to an exemplary embodiment of the present disclosure, the camera may include a first camera that obtains a left rear image of the trailer, and a second camera that obtains a right rear image of the trailer.

According to an exemplary embodiment of the present disclosure, the vehicle control method may further include generating a first virtual plane parallel to a line segment connecting the first camera to the second camera by performing an image rectification with respect to the left rear image, and determining coordinates of a first projection point at which a first vector connecting the first corner point to the first camera is projected onto the first virtual plane.

According to an exemplary embodiment of the present disclosure, the vehicle control method may further include generating a second virtual plane parallel to the line segment connecting the first camera to the second camera by performing an image rectification with respect to the right rear image, and determining coordinates of a second projection point at which a second vector connecting the first corner point to the second camera is projected onto the second virtual plane.

According to an exemplary embodiment of the present disclosure, the vehicle control method may further include estimating the position of the first corner point based on the coordinates of the first projection point and the coordinates of the second projection point.

According to an exemplary embodiment of the present disclosure, the vehicle control method may further include generating a first virtual plane parallel to a line segment connecting the first camera to the second camera by performing an image rectification with respect to the left rear image, and determining coordinates of a third projection point at which a third vector connecting the second corner point to the first camera is projected onto the first virtual plane.

According to an exemplary embodiment of the present disclosure, the vehicle control method may further include generating a second virtual plane parallel to the line segment connecting the first camera to the second camera by performing an image rectification with respect to the right rear image, and determining coordinates of a fourth projection point at which a fourth vector connecting the second corner point to the second camera is projected onto the second virtual plane.

According to an exemplary embodiment of the present disclosure, the vehicle control method may further include estimating the position of the second corner point based on the coordinates of the third projection point and the coordinates of the fourth projection point.

According to an exemplary embodiment of the present disclosure, the vehicle control method may further include generating a fifth vector perpendicular to a line segment connecting the first corner point to the second corner point.

According to an exemplary embodiment of the present disclosure, the vehicle control method may further include determining coordinates of a fifth projection point at which a sixth vector connecting the third corner point to the first camera is projected onto the first virtual plane, and estimating the position of the third corner point based on the coordinates of the fifth projection point and the fifth vector.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

In conjunction with the accompanying drawings.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Figure 1:
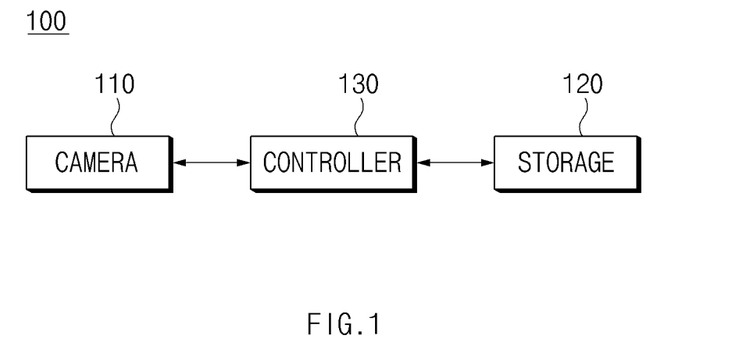
FIG. 1 is a diagram illustrating a configuration of a vehicle control apparatus, according to an exemplary embodiment of the present disclosure.
Figure 2:
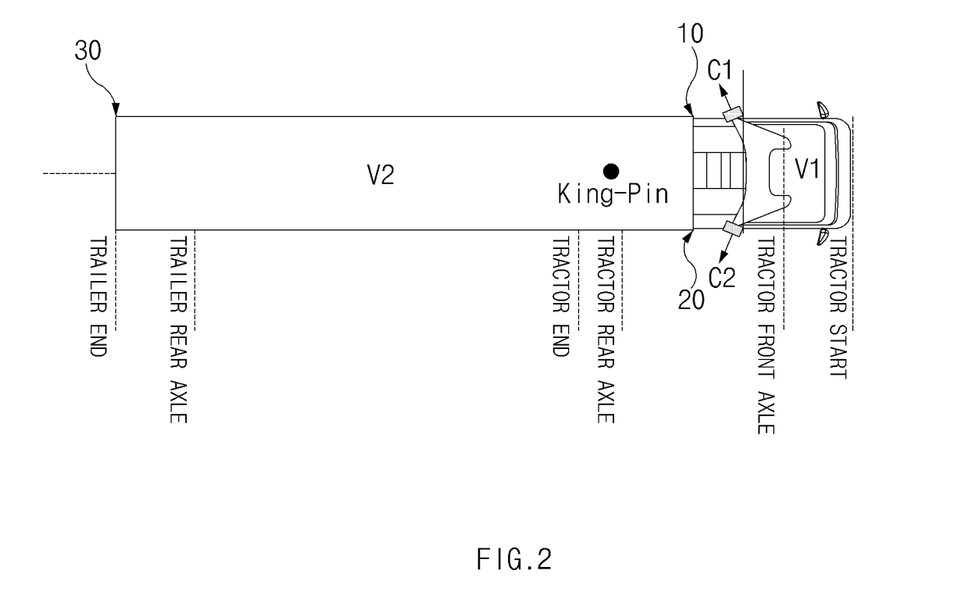
FIG. 2 is a diagram illustrating a towing vehicle and a trailer, according to an exemplary embodiment of the present disclosure.

FIG. 1 is a diagram illustrating a configuration of a vehicle control apparatus, according to an exemplary embodiment of the present disclosure, and FIG. 2 is a diagram illustrating a towing vehicle and a trailer, according to an exemplary embodiment of the present disclosure.

As illustrated in FIG. 1, a vehicle control apparatus 100 of the present disclosure may include a camera 110, storage 120, and a controller 130.

The camera 110 may include a stereo camera configured for obtaining an image around a vehicle. According to the exemplary embodiment of the present disclosure, the camera 110 may include a first camera C1 provided on the left rear side of a towing vehicle V1 to obtain a left rear image of the towing vehicle V1 of FIG. 2, and a second camera C2 provided on the right rear side of the towing vehicle V1 to obtain a right rear image of the towing vehicle V1. According to an exemplary embodiment of the present disclosure, the towing vehicle V1 may include a tractor truck that runs autonomously.

The storage 120 may store at least one algorithms for determining or executing various commands for the operation of the vehicle control apparatus 100, according to an exemplary embodiment of the present disclosure. The storage 120 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 130 may be implemented by various processing devices such as a microprocessor in which a semiconductor chip configured for determining or executing various commands is embedded, and the controller 130 may control the operation of the vehicle control device according to an exemplary embodiment of the present disclosure. An operation of the controller 130 will be more fully described with reference to FIG. 3 and FIG. 4.

Figure 3:
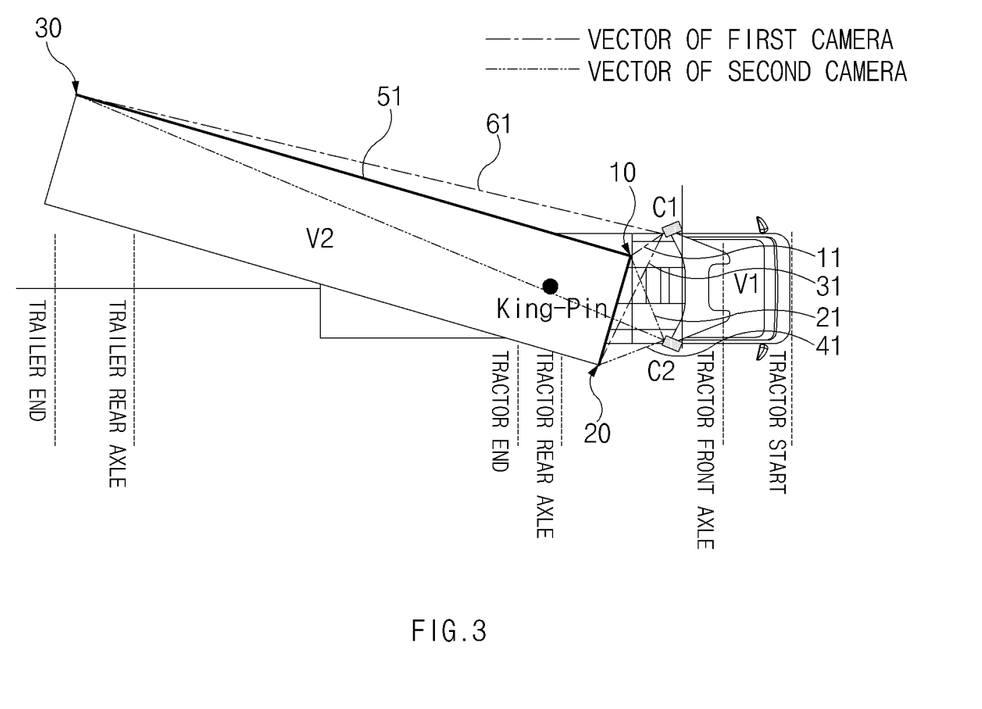
FIG. 3 and FIG. 4 are diagrams schematically illustrating a trailer length estimation method, according to an exemplary embodiment of the present disclosure.
Figure 4:
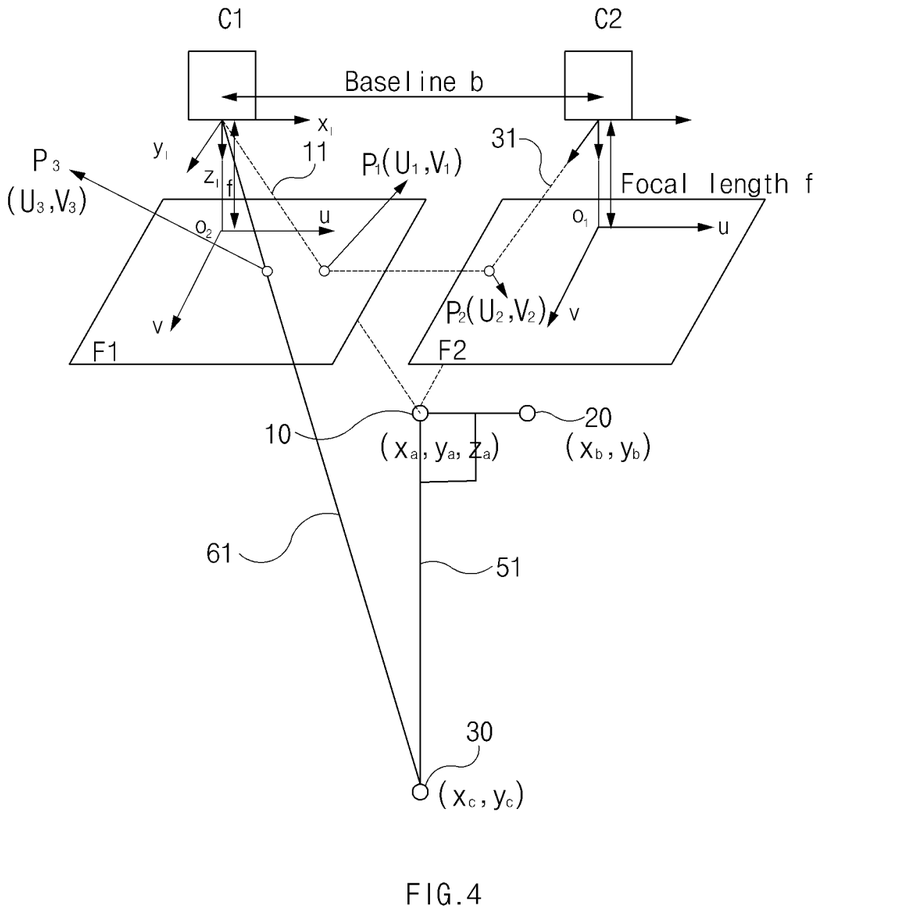

FIG. 3 and FIG. 4 are diagrams schematically illustrating a trailer length estimation method, according to an exemplary embodiment of the present disclosure.

As illustrated in FIG. 3, the controller 130 may estimate a position of a first corner point 10 by use of a first vector 11 connecting the first camera C1 to the first corner point 10 and a second vector 21 connecting the second camera C2 to the first corner point 10. According to an exemplary embodiment of the present disclosure, the first corner point 10 may mean the front left end portion of the trailer.

According to the exemplary embodiment of the present disclosure, as illustrated in FIG. 4, the controller 130 may generate a first virtual plane F1 parallel to a line segment connecting the first camera C1 to the second camera C2 by performing an image rectification with respect to the image obtained by the first camera C1, and may determine coordinates $U_1$ and $V_1$ of a first projection point $P_1$ at which the first vector 11 connecting the first corner point 10 to the first camera C1 is projected onto the first virtual plane F1. The controller 130 may determine the coordinates $U_1$ and $V_1$ of the first projection point $P_1$ by use of Equations 1 and 2.

$$U_1 = f\frac{x_a}{z_a} \qquad \langle \text{Equation 1} \rangle$$

$$V_1 = f\frac{y_a}{z_a} \qquad \langle \text{Equation 2} \rangle$$

(Where 'f' is the focal length of the lens of the first camera C1 and the focal length of the lens of the second camera C2.)

Furthermore, the controller 130 may generate a second virtual plane F2 parallel to the line segment connecting the first camera C1 to the second camera C2 by performing the image rectification with respect to the image obtained by the second camera C2, and may determine coordinates $U_2$ and $V_2$ of a second projection point $P_2$ at which the second vector 21 connecting a first corner point 10 to the second camera C2 is projected onto the second virtual plane F2. The controller 130 may determine the coordinates $U_2$ and $V_2$ of the second projection point $P_2$ by use of Equations 3 and 4.

$$U_2 = f\frac{x_a - b}{z_a} \qquad \langle \text{Equation 3} \rangle$$

$$V_2 = f\frac{y_a}{z_a} \qquad \langle \text{Equation 4} \rangle$$

(Where 'f' is the focal length of the lens of the first camera C1 and the focal length of the second camera C2, and 'b' is the distance between the lens of the first camera C1 and the lens of the second camera C2.)

The controller 130 may use Equations 5, 6, and 7 based on the coordinates of the first projection point $P_1$ and the coordinates of the second projection point $P_2$ to estimate a position (coordinates $x_a$, $y_a$, $z_a$) of the first corner point 10.

$$x_a = \frac{bU_1}{d} \qquad \langle \text{Equation 5} \rangle$$

$$y_a = \frac{bV_1}{d} \qquad \langle \text{Equation 6} \rangle$$

$$z_a = \frac{bV_1}{d} \qquad \langle \text{Equation 7} \rangle$$

$$\left(\text{where } d = U_1 - U_2 = f\frac{b}{z_a}\right)$$

Furthermore, the controller 130 may estimate the position of the second corner point 20 by use of a third vector 31 connecting the first camera C1 to the second corner point 20 and a fourth vector 41 connecting the second camera C2 to the second corner point 20. In the instant case, the second corner point 20 may mean a front right end portion of the trailer.

According to the exemplary embodiment of the present disclosure, the controller 130 may generate the first virtual plane F1 parallel to the line segment connecting the first camera C1 to the second camera C2 by performing the image rectification with respect to the image obtained by the first camera C1 in the same manner as illustrated in FIG. 4, and may determine coordinates of the third projection point at which the third vector 31 connecting the second corner point 20 to the first camera C1 is projected onto the first virtual plane F1.

According to the exemplary embodiment of the present disclosure, the controller 130 may generate the second virtual plane F2 parallel to the line segment connecting the first camera C1 to the second camera C2 by performing the image rectification with respect to the image obtained by the second camera C2, and may determine coordinates of the fourth projection point at which the fourth vector 41 connecting the second corner point 20 to the second camera C2 is projected onto the second virtual plane F2.

The controller 130 may estimate the position (the coordinates) of the second corner point 20 based on the coordinates of the third projection point and the coordinates of the fourth projection point.

When the position of the first corner point 10 and the position of the second corner point 20 are estimated, the controller 130 may determine whether the first camera C1 and the second camera C2 obtain an image including a third corner point 30 of a trailer V2.

When any one of the first camera C1 and the second camera C2 cannot obtain the image including the third corner point 30, the controller 130 may estimate the position of the third corner point 30 by use of the position of the estimated first corner point 10 and the position of the estimated second corner point 20. In the instant case, according to the exemplary embodiment of the present disclosure, the third corner point 30 may mean the rear left end portion of the trailer V2.

According to an exemplary embodiment of the present disclosure, the controller 130 may generate a fifth vector 51 perpendicular to a line segment connecting the first corner point 10 to the second corner point 20. According to the exemplary embodiment of the present disclosure, the controller 130 may represent the fifth vector 51 as an equation (Equation 10) of a straight line perpendicular to the line segment connecting the first corner point 10 and the second corner point 20, and may represent the line segment connecting the first corner point 10 to the second corner point 20 as an equation of a straight line of Equation 9.

$$(y - y_a) = \frac{(y_b - y_a)}{(x_b - x_a)}(x - x_a) \qquad \text{\langle Equation 9\rangle}$$

$$(y - y_a) = -\frac{(x_b - x_a)}{(y_b - y_a)}(x - x_a) \qquad \text{\langle Equation 10\rangle}$$

(where, the coordinates of the first corner point are $x_a$ and $y_a$ and the coordinates of the second corner point are $x_b$ and $y_b$).

The controller 130 may determine the coordinates Uc and Vc of the third projection point P3 at which the sixth vector 61 connecting the third corner point 30 to the first camera C1 is projected onto the first virtual plane F1 by use of Equation 11, and may estimate the position (coordinates ($x_c$ and $y_c$)) of the third corner point 30 by use of Equation 10 and Equation 11.

$$y_c = f\frac{x_c}{U_c} \qquad \text{\langle Equation 11\rangle}$$

The controller 130 may use Equation 12 based on the position of the first corner point 10 and the position of the third corner point 30 to determine a distance 'L' between the first corner point 10 and the third corner point 30, may estimate the distance 'L' between the first corner point 10 and the third corner point 30 as the length of the trailer.

$$L = \sqrt{(x_c - x_a)^2 + (y_c - y_a)^2} \qquad \text{\langle Equation 12\rangle}$$

According to an exemplary embodiment of the present disclosure, the controller 130 estimates the first corner point 10, the second corner point 20, and the third corner point 30 by use of a known corner detection method.

Figure 5:
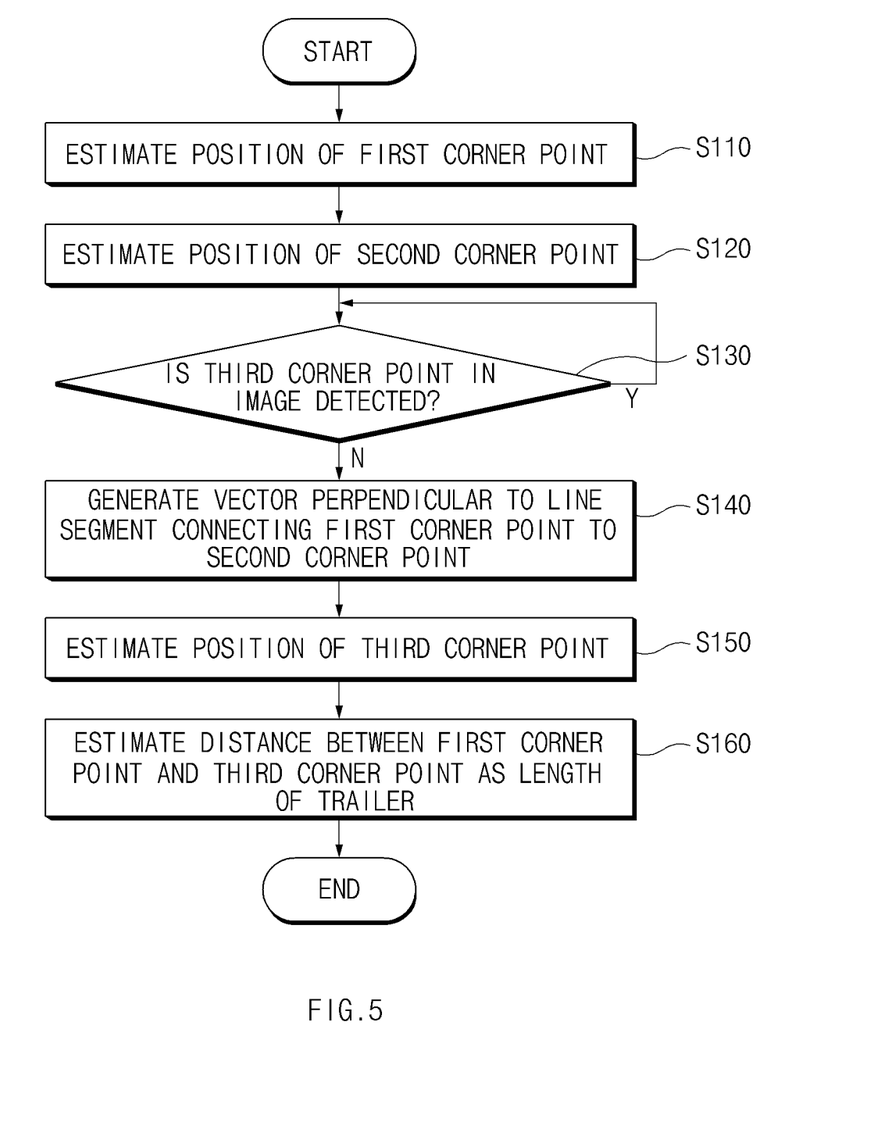
FIG. 5 is a flowchart illustrating a vehicle control method, according to an exemplary embodiment of the present disclosure.

FIG. 5 is a flowchart illustrating a vehicle control method, according to an exemplary embodiment of the present disclosure.

As illustrated in FIG. 5, the controller 130 may estimate the position of the first corner point 10 by use of the first vector 11 connecting the first camera C1 to the first corner point 10 and the second vector 21 connecting the second camera C2 to the first corner point 10 (S110). According to an exemplary embodiment of the present disclosure, in S110, the first corner point 10 may mean the front left end portion of the trailer.

According to the exemplary embodiment of the present disclosure, as illustrated in FIG. 4, in S110, the controller 130 may generate the first virtual plane F1 parallel to a line segment connecting the first camera C1 to the second camera C2 by performing an image rectification with respect to the image obtained by the first camera C1, and may determine the coordinates $U_1$ and $V_1$ of the first projection point $P_1$ at which the first vector 11 connecting the first corner point 10 to the first camera C1 is projected onto the first virtual plane F1.

Furthermore, in S110, the controller 130 may generate the second virtual plane F2 parallel to the line segment connecting the first camera C1 to the second camera C2 by performing the image rectification with respect to the image obtained by the second camera C2, and may determine the coordinates $U_2$ and $V_2$ of the second projection point $P_2$ at which the second vector 21 connecting the first corner point 10 to the second camera C2 is projected onto the second virtual plane F2. The controller 130 may determine the coordinates $U_2$ and $V_2$ of the second projection point $P_2$ by use of Equations 3 and 4.

In S110, the controller 130 may use Equations 5, 6, and 7 based on the coordinates of the first projection point $P_1$ and the coordinates of the second projection point $P_2$ to estimate the position (coordinates $x_a$, $y_a$, z) of the first corner point 10.

Furthermore, the controller 130 may estimate the position of the second corner point 20 by use of the third vector 31 connecting the first camera C1 to the second corner point 20 and the fourth vector 41 connecting the second camera C2 to the second corner point 20 (S120). In the instant case, the second corner point 20 may mean a front right end portion of the trailer.

According to the exemplary embodiment of the present disclosure, in S120, the controller 130 may generate the first virtual plane F1 parallel to the line segment connecting the first camera C1 to the second camera C2 by performing the image rectification with respect to the image obtained by the first camera C1 in the same manner as illustrated in FIG. 4, and may determine coordinates of the third projection point at which the third vector 31 connecting the second corner point 20 to the first camera C1 is projected onto the first virtual plane F1.

According to the exemplary embodiment of the present disclosure, in S120, the controller 130 may generate the second virtual plane F2 parallel to the line segment connecting the first camera C1 to the second camera C2 by performing the image rectification with respect to the image obtained by the second camera C2, and may determine coordinates of the fourth projection point at which the fourth vector 41 connecting the second corner point 20 to the second camera C2 is projected onto the second virtual plane F2.

In S120, the controller 130 may estimate the position (the coordinates) of the second corner point 20 based on the coordinates of the third projection point and the coordinates of the fourth projection point.

When the position of the first corner point 10 and the position of the second corner point 20 are estimated, the controller 130 may determine whether the first camera C1 and the second camera C2 obtain an image including the third corner point 30 of the trailer V2 (S130).

In S130, when the controller 130 cannot obtain the image including the third corner point 30 with any one of the first camera C1 and the second camera C2 (N), the controller 130 may generate a fifth vector perpendicular to a line segment (refer to Equation 9) connecting the first corner point 10 to the second corner point 20 (S140).

In S140, the controller 130 may represent the fifth vector 51 as the equation (Equation 10) of a straight line perpendicular to the line segment connecting the first corner point 10 and the second corner point 20, and may represent the line segment connecting the first corner point 10 to the second corner point 20 as an equation of a straight line of Equation 9.

Furthermore, the controller 130 may determine the coordinates Uc and Vc of the third projection point P3 at which the sixth vector 61 connecting the third corner point 30 to the first camera C1 is projected onto the first virtual plane F1 by use of Equation 11, and may estimate the position (coordinates ($x_c$ and $y_c$)) of the third corner point 30 by use of Equation 10 and Equation 11 (S150). In the instant case, according to the exemplary embodiment of the present disclosure, the third corner point 30 may mean the rear left end portion of the trailer.

The controller 130 may use Equation 12 based on the position of the first corner point 10 and the position of the third corner point 30 to determine a distance 'L' between the first corner point 10 and the third corner point 30, may estimate the distance 'L' between the first corner point 10 and the third corner point 30 as the length of the trailer (S160).

Figure 6:
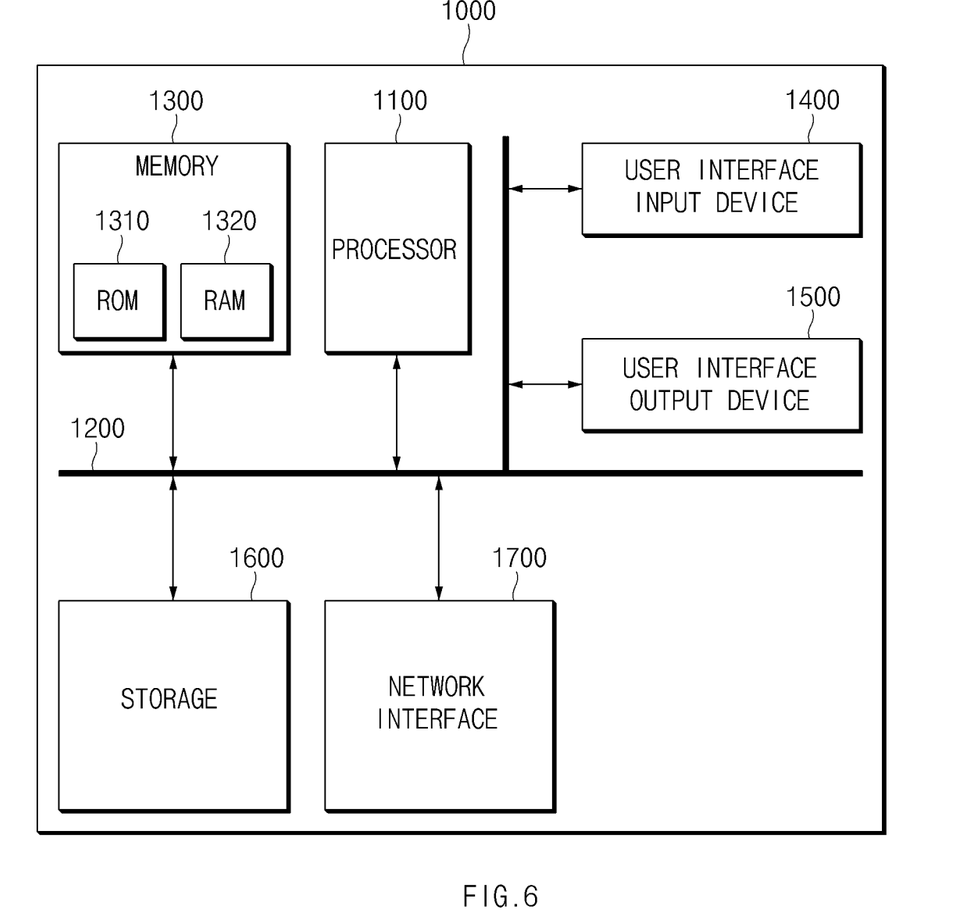
FIG. 6 is a diagram illustrating a configuration of a computing system executing a method according to an exemplary embodiment of the present disclosure.

FIG. 6 is a diagram illustrating a configuration of a computing system executing a method according to an exemplary embodiment of the present disclosure.

Referring to FIG. 6, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an exemplary embodiment of the present disclosure, a vehicle control apparatus and method improve the stability of autonomous driving by reducing the risk of lane encroachments and vehicle collisions, by allowing an autonomous vehicle towing a trailer to actively estimate the length of the trailer.

The above description is merely illustrative of the technical idea of the present disclosure, and those of ordinary skill in the art to which the present disclosure pertains will be able to make various modifications and variations without departing from the essential characteristics of the present disclosure.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:
   a camera configured to obtain a surrounding image of a vehicle; and
   a controller configured to estimate a position of a first corner point and a position of a second corner point of a trailer connected to the vehicle based on the surrounding image, to estimate a position of a third corner point of the trailer using a position of the camera, the position of the first corner point, and the position of the second corner point, and to estimate a length of the trailer based on the position of the first corner point and the position of the third corner point,
wherein the first corner point includes a front left end portion of the trailer and the second corner point includes a front right end portion of the trailer, and
wherein the controller estimates the first corner point and the second corner point using vectors connecting each of the first and second corner points and the camera.

2. The vehicle control apparatus of claim 1, wherein the surrounding image includes a left rear image of the trailer and a right rear image of the trailer, and
wherein the camera includes:
a first camera configured to obtain the left rear image of the trailer; and
a second camera configured to obtain the right rear image of the trailer.

3. The vehicle control apparatus of claim 2, wherein the vectors include a first vector, and
wherein the controller is configured to:
generate a first virtual plane parallel to a line segment connecting the first camera to the second camera by performing an image rectification with respect to the left rear image, and
determine coordinates of a first projection point at which the first vector connecting the first corner point to the first camera is projected onto the first virtual plane.

4. The vehicle control apparatus of claim 3, wherein the vectors include a second vector, and
wherein the controller is configured to:
generate a second virtual plane parallel to the line segment connecting the first camera to the second camera by performing an image rectification with respect to the right rear image, and
determine coordinates of a second projection point at which the second vector connecting the first corner point to the second camera is projected onto the second virtual plane.

5. The vehicle control apparatus of claim 4, wherein the controller is configured to:
estimate the position of the first corner point based on the coordinates of the first projection point and the coordinates of the second projection point.

6. The vehicle control apparatus of claim 2, wherein the vectors include a third vector, and
wherein the controller is configured to:
generate a first virtual plane parallel to a line segment connecting the first camera to the second camera by performing an image rectification with respect to the left rear image, and
determine coordinates of a third projection point at which the third vector connecting the second corner point to the first camera is projected onto the first virtual plane.

7. The vehicle control apparatus of claim 6, wherein the vectors further includes a fourth vector, and
wherein the controller is configured to:
generate a second virtual plane parallel to the line segment connecting the first camera to the second camera by performing an image rectification with respect to the right rear image, and
determine coordinates of a fourth projection point at which the fourth vector connecting the second corner point to the second camera is projected onto the second virtual plane.

8. The vehicle control apparatus of claim 7, wherein the controller is configured to:
estimate the position of the second corner point based on the coordinates of the third projection point and the coordinates of the fourth projection point.

9. The vehicle control apparatus of claim 3, wherein the vectors include a fifth vector, and
wherein the controller is configured to:
generate the fifth vector perpendicular to a line segment connecting the first corner point to the second corner point.

10. The vehicle control apparatus of claim 9, wherein the vectors further include a sixth vector, and
wherein the controller is configured to:
determine coordinates of a fifth projection point at which the sixth vector connecting the third corner point to the first camera is projected onto the first virtual plane, and
determine the position of the third corner point based on the coordinates of the fifth projection point and the fifth vector.

11. A vehicle control method comprising:
obtaining, by a camera, a surrounding image of a vehicle;
estimating, by a controller, a position of a first corner point and a position of a second corner point of a trailer connected to the vehicle, based on the surrounding image;
estimating, by the controller, a position of a third corner point of the trailer by use of a position of the camera, the position of the first corner point, and the position of the second corner point; and
estimating, by the controller, a length of the trailer based on the position of the first corner point and the position of the third corner point,
wherein the first corner point includes a front left end portion of the trailer and the second corner point includes a front right end portion of the trailer, and
wherein the controller estimates the first corner point and the second corner point using vectors connecting each of the first and second corner points and the camera.

12. The vehicle control method of claim 11, wherein the surrounding image includes a left rear image of the trailer and a right rear image of the trailer, and
wherein the camera includes:
a first camera configured to obtain the left rear image of the trailer; and
a second camera configured to obtain the right rear image of the trailer.

13. The vehicle control method of claim 12, wherein the vectors include a first vector, and
wherein the method further includes:
generating, by the controller, a first virtual plane parallel to a line segment connecting the first camera to the second camera by performing an image rectification with respect to the left rear image; and
determining, by the controller, coordinates of a first projection point at which the first vector connecting the first corner point to the first camera is projected onto the first virtual plane.

14. The vehicle control method of claim 13, wherein the vectors include a second vector, and
wherein the method further includes:
generating, by the controller, a second virtual plane parallel to the line segment connecting the first camera to the second camera by performing an image rectification with respect to the right rear image; and
determining, by the controller, coordinates of a second projection point at which the second vector connecting the first corner point to the second camera is projected onto the second virtual plane.

15. The vehicle control method of claim 14, further including:
estimating, by the controller, the position of the first corner point based on the coordinates of the first projection point and the coordinates of the second projection point.

16. The vehicle control method of claim 12,
wherein the vectors include a first vector, and
wherein the method further includes:
generating, by the controller, a first virtual plane parallel to a line segment connecting the first camera to the second camera by performing an image rectification with respect to the left rear image; and
determining, by the controller, coordinates of a third projection point at which the third vector connecting the second corner point to the first camera is projected onto the first virtual plane.

17. The vehicle control method of claim 16,
wherein the vectors include a fourth vector, and
wherein the method further includes:
generating, by the controller, a second virtual plane parallel to the line segment connecting the first camera to the second camera by performing an image rectification with respect to the right rear image; and
determining, by the controller, coordinates of a fourth projection point at which the fourth vector connecting the second corner point to the second camera is projected onto the second virtual plane.

18. The vehicle control method of claim 17, further including:
estimating, by the controller, the position of the second corner point based on the coordinates of the third projection point and the coordinates of the fourth projection point.

19. The vehicle control method of claim 13,
wherein the vectors include a fifth vector, and
wherein the method further includes:
generating, by the controller, the fifth vector perpendicular to a line segment connecting the first corner point to the second corner point.

20. The vehicle control method of claim 19,
wherein the vectors include a sixth vector, and
wherein the method further includes:
determining, by the controller, coordinates of a fifth projection point at which the sixth vector connecting the third corner point to the first camera is projected onto the first virtual plane, and
estimating, by the controller, the position of the third corner point based on the coordinates of the fifth projection point and the fifth vector.

\* \* \* \* \*